US012590897B2

(12) United States Patent
Tian et al.

(10) Patent No.: US 12,590,897 B2
(45) Date of Patent: Mar. 31, 2026

(54) OPTICAL-FIBER RAMAN PHOTOMETER, CONSTRUCTION METHOD THEREFOR AND APPLICATION THEREOF

(71) Applicant: EAST CHINA NORMAL UNIVERSITY, Shanghai (CN)

(72) Inventors: Yang Tian, Shanghai (CN); Zhichao Liu, Shanghai (CN)

(73) Assignee: EAST CHINA NORMAL UNIVERSITY, Shanghai (CN)

( * ) Notice: Subject to any disclaimer, the term of this patent is extended or adjusted under 35 U.S.C. 154(b) by 142 days.

(21) Appl. No.: 18/681,426

(22) PCT Filed: Aug. 4, 2022

(86) PCT No.: PCT/CN2022/110235
§ 371 (c)(1),
(2) Date: Feb. 5, 2024

(87) PCT Pub. No.: WO2023/011582
PCT Pub. Date: Feb. 9, 2023

(65) Prior Publication Data
US 2024/0310285 A1     Sep. 19, 2024

(30) Foreign Application Priority Data

Aug. 6, 2021     (CN) ......................... 202110901738.5

(51) Int. Cl.
*G01J 3/44*          (2006.01)
*G01N 21/65*       (2006.01)

(52) U.S. Cl.
CPC ....... *G01N 21/65* (2013.01); *G01N 2021/656* (2013.01); *G01N 2201/06113* (2013.01);
(Continued)

(58) Field of Classification Search
CPC .... G01N 21/65; G01N 21/658; A61B 5/0059; A61B 5/4064; G01J 3/02; G01J 3/10; G01J 3/44
See application file for complete search history.

(56) References Cited

U.S. PATENT DOCUMENTS

| | | | |
|---|---|---|---|
| 2007/0053204 A1* | 3/2007 | Krohne .............. | G02B 21/0028 362/574 |
| 2009/0021724 A1* | 1/2009 | Mahadevan-Jansen ..................... | G01N 21/65 356/73 |

(Continued)

FOREIGN PATENT DOCUMENTS

| | | |
|---|---|---|
| CN | 106706570 A | 5/2017 |
| CN | 108627494 A | 10/2018 |

OTHER PUBLICATIONS

Wang et al., "Progress of Raman imaging technology in brain glioma detection," Chinese Journal of Clinical Pharmacy, vol. 25, No. 6, 2016, pp. 398-401.

*Primary Examiner* — Abdullahi Nur
(74) *Attorney, Agent, or Firm* — Birch, Stewart, Kolasch & Birch, LLP

(57)          ABSTRACT

An optical-fiber Raman photometer. The optical-fiber Raman photometer comprises: a light source portion; a scanning system, wherein the core of the scanning system is based on a laser confocal unit, the scanning system comprises a first filter, a second filter, a first reflector, a second reflector, a scanner and an objective lens, and an excitation light is generated from a fiber laser, then passes through the first filter, the first reflector, the second filter and the second reflector in sequence and enters the scanner, and is then focused by means of the objective lens; a detection system, wherein the detection system performs signal transmission and collection based on a multi-mode optical fiber, an end of
(Continued)

the optical fiber is tapered, an incident light enters the optical fiber after being focused by the objective lens, the excitation light is emitted from the tapered end of the optical fiber to excite a probe to generate Raman signals, and the Raman signals are then collected by means of the same optical fiber; and a signal collection system, wherein the signal collection system partially overlaps with the scanning system, and when the Raman signals collected by the optical fiber return to the scanner, the Raman signals return to a Raman spectrometer by means of the second reflector and the second filter, and the Raman spectrometer reads out the Raman signals.

7 Claims, 4 Drawing Sheets

(52) U.S. Cl.
    CPC ................ *G01N 2201/0826* (2013.01); *G01N 2201/0833* (2013.01)

(56)                     References Cited

U.S. PATENT DOCUMENTS

2013/0278930 A1 * 10/2013 Liu ..................... G01N 21/718
                                                    356/318
2016/0003741 A1 *  1/2016 Diebold ............ G02B 21/0076
                                                    250/578.1
2018/0020913 A1 *  1/2018 Grundfest ............. G02B 26/10
                                                    351/206
2020/0003618 A1 *  1/2020 Fujita ................... G01J 3/2823
2021/0025758 A1     1/2021 Katz
2021/0382086 A1 * 12/2021 Chen ..................... G01Q 60/58

* cited by examiner

OPTICAL-FIBER RAMAN PHOTOMETER, CONSTRUCTION METHOD THEREFOR AND APPLICATION THEREOF

TECHNICAL FIELD

The present invention relates to the technical field of spectral imaging and biosensing technology, and relates to an optical-fiber Raman photometer, construction method and application thereof.

BACKGROUND OF THE INVENTION

As the most advanced part of the central nervous system, changes in the internal environment of the brain will bring about a series of diseases. Especially in the deep brain regions, changes in their internal environment have more important pathological significance. Carrying out research on deep brain regions is conducive to clarifying the structure and function of the nervous system, thereby revealing the neural mechanism of brain work, and providing a more reliable basis for the diagnosis and treatment of related diseases. Traditional functional magnetic resonance imaging and electrophysiological techniques are widely used in brain imaging analysis, but they are generally limited by low spatial resolution and difficulty in distinguishing chemical signals of different substances. Based on the high spectral resolution of molecular fingerprint information, surface-enhanced Raman spectroscopy (SERS) provides the best strategy for detecting chemical signal changes of different substances, with the advantages of resistance to photo-bleaching and autofluorescence. However, in traditional Raman instruments, the penetration ability of excitation light is limited, and it can only be used for the detection of signals at the solution, cell or tissue level, and it is difficult to be used for the collection of Raman signals in the living body, especially in the deep brain regions. Therefore, There is an urgent need to develop an instrument that can be used to collect Raman signals from deep brain regions in the living body.

SUMMARY OF THE INVENTION

An object of the present invention is to provide a construction method and application of an optical-fiber Raman photometer, said optical-fiber Raman photometer has good biocompatibility and can realize the acquisition of Raman signals in deep brain regions.

The present invention provides an optical-fiber Raman photometer, as shown in FIG. 6.

Said optical-fiber Raman photometer comprises the following components:

(1) Light source portion. The light source portion is a fiber laser, whose excitation center wavelength is 785 nm±0.5 nm, etc.; the output power is adjustable from 0-500 mW; the line width is less than 0.1 nm; the output interface is SMA905 or FC/PC; the working voltage is 220V.

(2) Scanning system. The core of the scanning system is based on the laser confocal unit, which includes the first filter, the second filter, the first reflector, the second reflector, the scanner, the objective lens and other components. When the excitation light is generated from the fiber laser, it enters the scanner through filters and reflectors, and then is focused by the objective lens. The first filter is a bandpass filter, which allows the light of 785 nm to pass through; the second filter is a notch filter, which is mainly used to filter incident light. Both the first reflector and the second reflector are total reflectors. The scanner is a laser confocal scanning unit. The magnification of the objective lens is 10×, NA 0.25. As shown in FIG. 7.

(3) Detection system. The detection system is mainly based on the signal transmission and collection of the multi-mode optical fiber. The end of the optical fiber is tapered, the incident light enters the optical fiber after being focused by the objective lens, and the excitation light is emitted from the tapered end of the optical fiber to excite the probe to generate Raman signals, which is then collected through the same optical fiber. The fiber is a multi-mode optical fiber with a core of 200 microns and a cladding of 25 microns. The numerical aperture (NA) is 0.22, and the transmission range is 400-1100 nm. The taper length at the end of the optical fiber is 480 microns. As shown in FIG. 8:

(4) Signal collection system. The signal collection system partially overlaps with the scanning system. When the Raman signal collected by the optical fiber returns to the scanner, it further passes through the second reflector and the second filter and returns to the Raman spectrometer, and the Raman spectrometer reads out the Raman signals. The scanner is a laser confocal scanning unit. The objective lens magnification is 10×, NA 0.25. The second reflectors are all total reflectors; the second filter is a notch filter to filter 785 nm incident light. As shown in FIG. 9.

The present invention provides a method for constructing an optical-fiber Raman photometer, comprising the following steps:

Step 1: Assemble the confocal scanning unit, specifically including the following sub-steps:

Step 1-1: Install the first filter, the first reflector, the second filter, and the second reflector in sequence;

Step 1-2: Install the objective lens;

Step 2: Build the scanning system, specifically including the following sub-steps:

Step 2-1: Connect the fiber laser to the confocal scanning unit through an optical fiber;

Step 2-2: Debug the optical path, test that the excitation light can pass through the confocal scanning unit and be transmitted out by the objective lens;

Step 3: Build the detection system, specifically including the following sub-steps:

Step 3-1: Taper the optical fiber to obtain a tapered optical fiber to improve the efficiency of optical fiber signal collection;

Step 3-2: Assemble the tapered optical fiber to the end of the scanning system, and debug the excitation light coupling into the optical fiber;

Step 4: Build a signal collection system, specifically including the following sub-steps:

Step 4-1: Connect the Raman spectrometer to the confocal scanning unit through the optical fiber;

Step 4-2: Test the Raman signal collection.

The present invention also provides the application of the optical-fiber Raman photometer constructed by the above-mentioned method in collecting Raman signals in vivo and/or in vitro.

The present invention also provides the application of the optical-fiber Raman photometer constructed by the above-mentioned method in the collection of Raman molecular signals in vitro under the excitation of excitation light, and said Raman molecules is such as rhodamine B, copper titanocyanine, and cyanine dye 5.

Wherein said wavelength of the excitation light is such as 633 nm, 785 nm, preferably, is 785 nm.

Wherein, said Raman molecule concentration is 0.1-5 mM, preferably, is 1 mM.

Wherein, the scanning range is 100-3200 $cm^{-1}$, preferably, is 1000-1800 $cm^{-1}$.

The present invention also provides the application of the optical-fiber Raman photometer constructed by the above-mentioned method in the collection of Raman molecular signals in different brain regions under the excitation of the excitation light, and the different brain regions are cortex, hippocampus, striatum, thalamus.

Wherein, said wavelength of the excitation light is 633 nm, 785 nm, preferably, is 785 nm.

Wherein, said Raman molecule is such as rhodamine B, copper titanocyanine, cyanine dye 5; preferably, is rhodamine B.

Wherein, the scanning range is 100-3200 $cm^{-1}$, preferably, is 1000-1800 $cm^{-1}$.

The beneficial effects of the present invention is: constructing an optical-fiber Raman photometer, which can realize the acquisition of Raman signals in deep tissues of living animals, and this application function is not available in current commercial Raman instruments.

PREFERRED EMBODIMENTS OF THE INVENTION

The following examples and drawings are given to further illustrate the specific solutions of the present invention. The process, conditions, experimental methods, and so on for implementing the present invention are all general knowledge and common knowledge in the art except for the contents specifically mentioned below, and the present invention has no special limitation.

The present invention discloses a construction method and application of an optical-fiber Raman photometer. First, a portable Raman spectrum signal acquisition device was built. On this basis, a optical-fiber Raman photometer was further built to achieve efficient collection of Raman signals in vitro and in vivo. The optical-fiber Raman photometer consists of four parts, including a light source, a scanning system, a detection system, and a signal collection system. The present invention also discloses the application of the optical-fiber Raman system in collecting Raman signals in solutions and brain slices.

Figure 1:
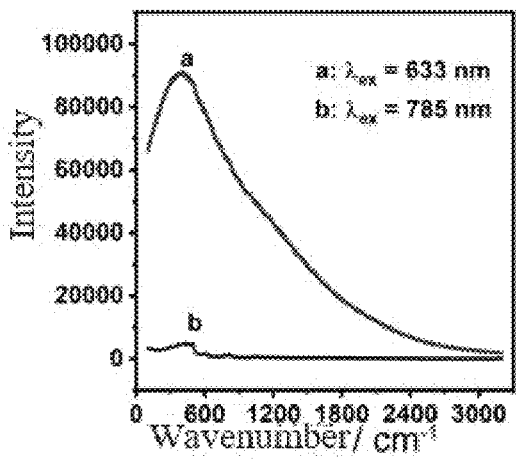
FIG. 1 is Raman spectra diagram of a blank optical fiber detected at different excitation wavelengths in Example 1.

Example 1 Collection of Blank Optical-Fiber Signals of the Optical-Fiber Raman Photometer As shown in FIG. 1, the Raman spectra of the fiber itself of the fiber Raman spectrophotometer under the excitation of different excitation lights.

Example 2 Optical-Fiber Raman Photometer is Used to Collect Signals of Different Raman Molecules in Solution In order to evaluate the Raman signal collection of Raman molecules in solution by an optical-fiber Raman photometer, different molecules, including rhodamine B, copper titanocyanine, and cyanine dye 5, were first dissolved in ethanol to prepare a 1 mM solution, and then the signal was collected. The method for measuring Raman signal molecules in the solution in the present invention is simpler and more convenient than the existing instrument measurement methods, and does not require additional focusing processes.

Figure 2:
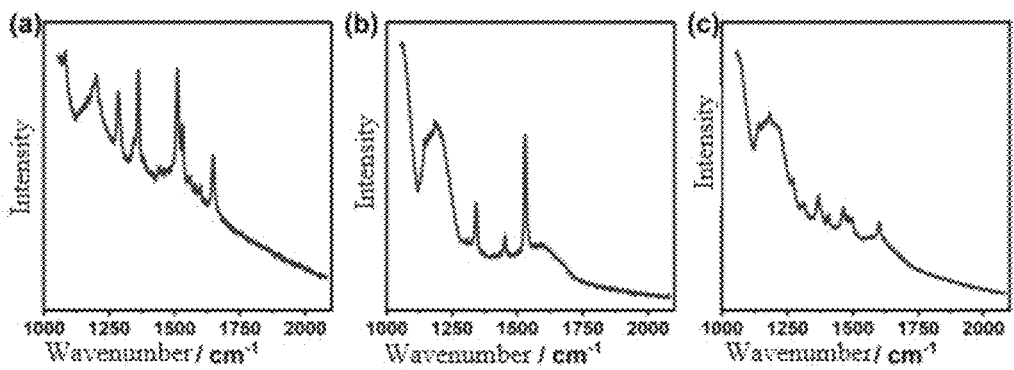
FIG. 2 is the Raman spectra of (a) rhodamine B, (b) copper titanocyanine, and (c) cyanine 5 collected under the excitation of 785 nm wavelength laser in Example 2.

As shown in FIG. 2, the Raman spectra of different Raman molecules have Raman characteristic peaks of different molecules.

Figure 3:
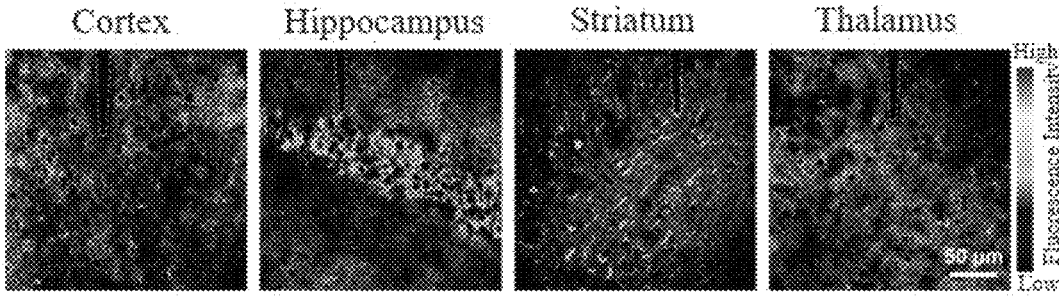
FIG. 3 is schematic diagrams of different brain regions targeted by optical fibers in Example 3.
Figure 4:
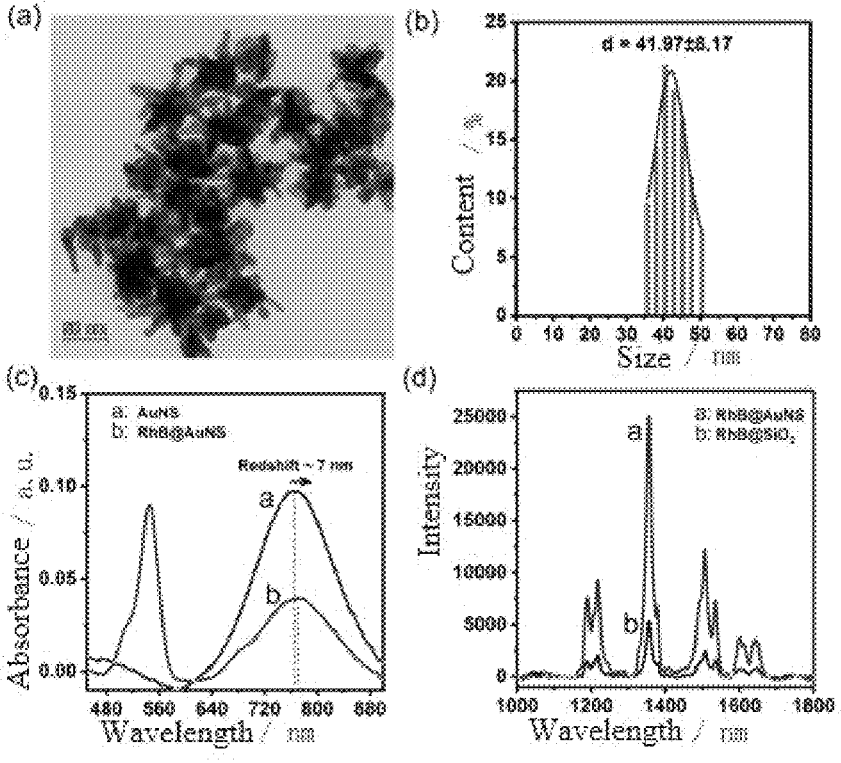
FIG. 4 is the Raman probe prepared in Example 3. (a) TEM (Transmission Electron Microscope) characterization of gold nanostars; (b) particle size distribution of gold nanostars; (c) UV absorption characterization of gold nanostars (AuNS) and Raman probes (RhB@AuNS); (d) Raman spectra of aminorhodamine B (RhB) and Raman probe (RhB@AuNS) under 785 nm excitation.

Example 3 Optical-fiber Raman Photometer Is Used to Collect Raman Signals in Different Brain Regions To evaluate the use of optical-fiber Raman photometer for collecting Raman signals from different brain regions, the ability of optical fibers to target brain regions was first evaluated. As shown in FIG. 3, the optical fibers can effectively target brain regions such as cerebral cortex, hippocampus, striatum, and thalamus. On the other hand, to enhance the Raman signal of the molecule, gold nanostars (AuNS) were further synthesized. As shown in FIG. 4, the transmission electron microscope results show that the prepared gold nanostars are uniformly dispersed, and the particle size is about 41.97±8.17 nm. Subsequently, the aminorhodamine B molecule (RhB) was modified on the gold nanostars through the interaction between gold and amino groups. The ultraviolet absorption showed that the absorption of AuNS alone was around 760 nm. When RhB was modified on AuNS, the absorption of AuNS was redshifted by 7 nm, and an obvious RhB absorption peak (~550 nm) appeared. In addition, Raman spectroscopy showed that when RhB molecules were modified to AuNS, the Raman signal of RhB was significantly enhanced. These results indicated that the RhB@AuNS probe was successfully prepared.

Figure 5:
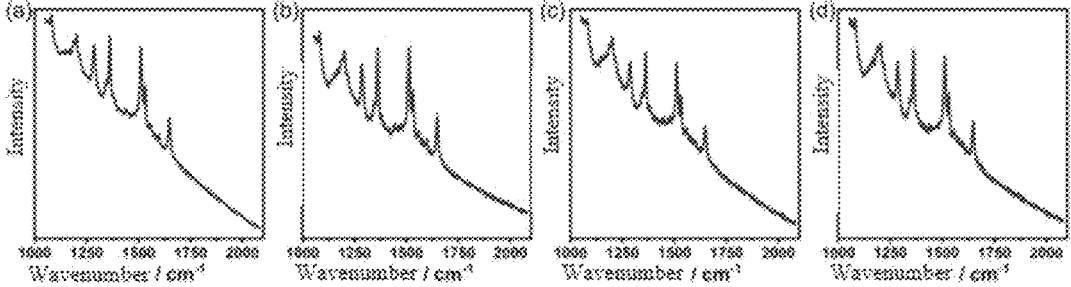
FIG. 5 is the Raman spectra of the probes collected in different brain regions in Example 3. (a) cortex; (b) hippocampus; (c) striatum; (d) thalamus.
Figure 6:
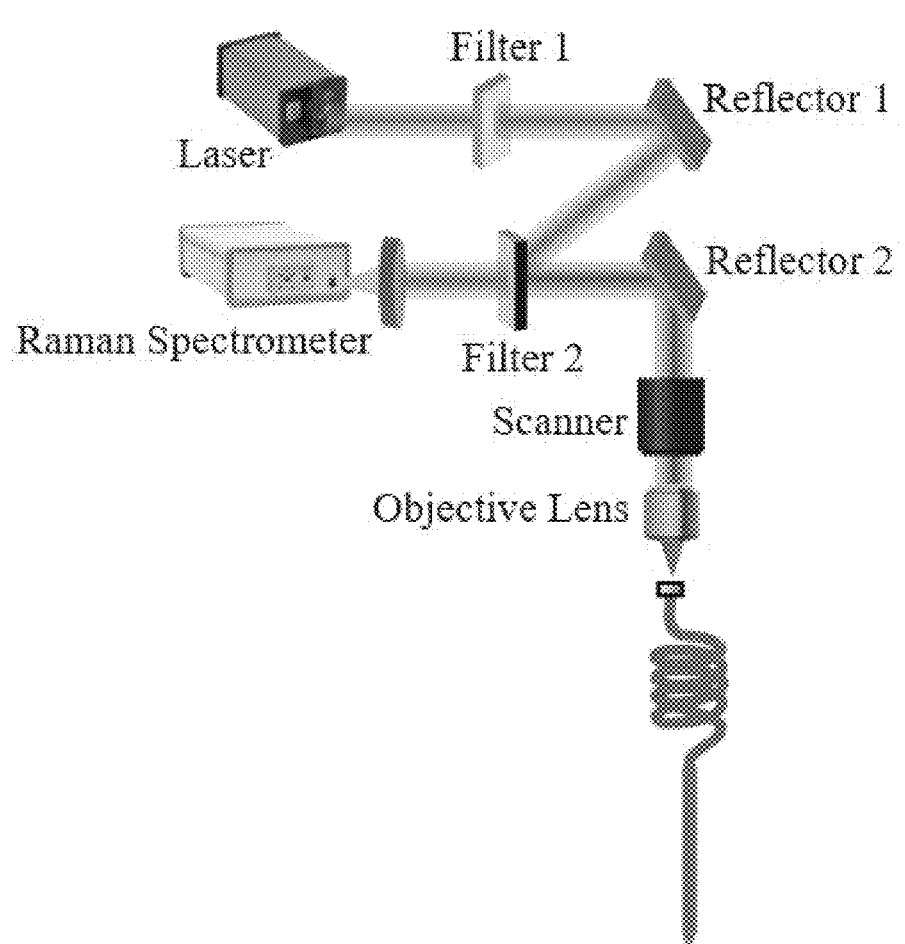
FIG. 6 is a schematic diagram of an optical-fiber Raman photometer of the present invention.
Figure 7:
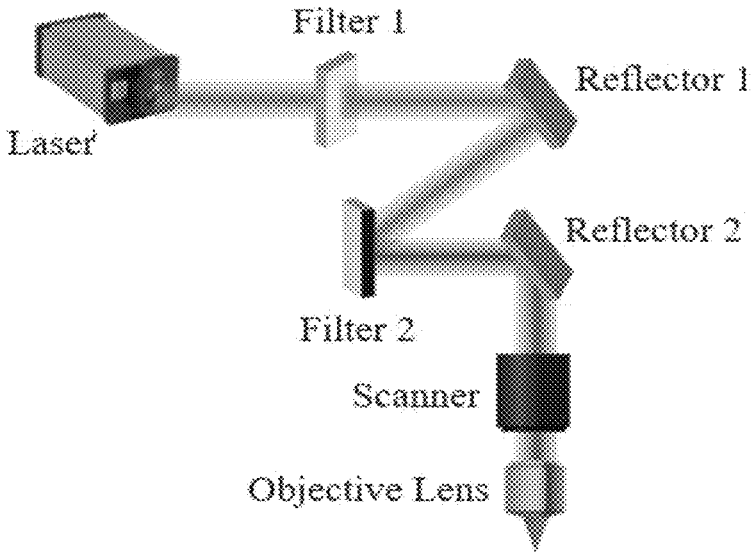
FIG. 7 is a schematic diagram of a fiber optic Raman photometer scanning system of the present invention.
Figure 8:
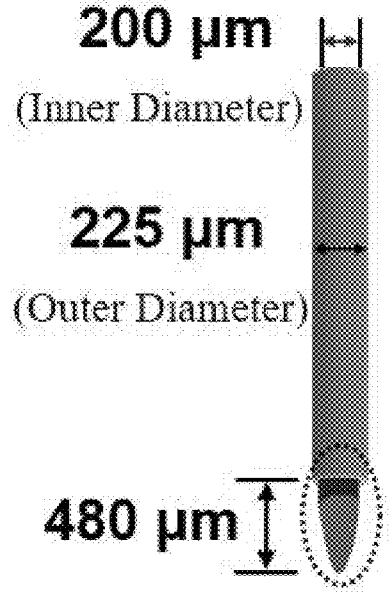
FIG. 8 is a schematic diagram of a fiber optic Raman photometer detection system of the present invention.
Figure 9:
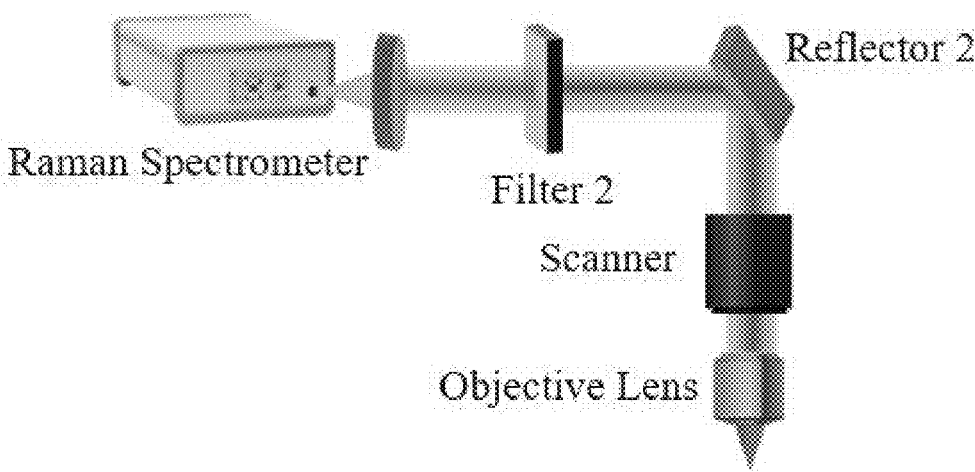
FIG. 9 is a schematic diagram of a fiber optic Raman photometer signal collection system of the present invention.

Subsequently, the RhB@AuNS probe was incubated with the brain slices for 30 minutes, and then the Raman signals of different brain regions were collected with the fiber-optic photometer. As shown in FIG. 5, the fiber-optic Raman photometer can be used to collect the Raman signals of the probes in different brain regions. This is the first reported device that can collect Raman signals in deep brain regions.

The protection content of the present invention is not limited to the above examples. Without departing from the spirit and scope of the inventive concept, variations and advantages that can occur to those skilled in the art are included in the present invention, and the appended claims are the scope of protection.

What is claimed:

1. A method for constructing an optical-fiber Raman photometer, comprising the following steps:

Step 1: assemble a confocal scanning unit, specifically including the following sub-steps:

Step 1-1: install a first filter, a first reflector, a second filter, and a second reflector in sequence;

Step 1-2: install an objective lens;

Step 2: build a scanning system, specifically including the following sub-steps:

Step 2-1: connect a fiber laser to the confocal scanning unit through an optical fiber;

Step 2-2: debug the optical path, test that excitation light can pass through the confocal scanning unit and be transmitted out by the objective lens;

Step 3: build a detection system, specifically including the following sub-steps:

Step 3-1: taper the optical fiber to obtain a tapered optical fiber to improve efficiency of optical fiber signal collection;

Step 3-2: assemble the tapered optical fiber to the end of the scanning system, and debug excitation light coupling into the optical fiber;

Step 4: build a signal collection system, specifically including the following sub-steps:

Step 4-1: connect a Raman spectrometer to the confocal scanning unit through the optical fiber;

Step 4-2: test the Raman signal collection system;

wherein the optical-fiber Raman photometer comprises:

a light source portion, wherein said light source portion is a fiber laser;

a scanning system, wherein a core of said scanning system is based on the laser confocal unit, including the first filter, the second filter, the first reflector, the second reflector, the scanner, and the objective lens, when the excitation light is generated from the fiber laser, it passes through the first filter, the first reflector, the second filter and the second reflector in sequence and enters the scanner, and is then focused by means of the objective lens;

the detection system, wherein said detection system performs signal transmission and collection based on a multi-mode optical fiber, an end of the optical fiber is tapered, incident light enters the optical fiber after being focused by the objective lens, excitation light is emitted from the tapered end of the optical fiber to excite probes to generate Raman signals, and the Raman signals are then collected by means of the same optical fiber;

the signal collection system, wherein said signal collection system partially overlaps with the scanning system, and when the Raman signals collected by the optical fiber return to the scanner, the Raman signals return to the Raman spectrometer by means of the second reflector and the second filter, and the Raman spectrometer reads out the Raman signals.

2. Application of the optical-fiber Raman photometer constructed by the method of claim 1 in collecting the Raman signals in vivo and/or in vitro.

3. Application of the optical-fiber Raman photometer constructed by the method of claim 1 for in vitro Raman molecular signal collection under the excitation of the excitation light; wherein, said Raman molecules include rhodamine B, copper titanocyanine, and cyanine dye 5;

said excitation light includes 633 nm, 785 nm;

said Raman molecule concentration is 0.1-5 mM;

the scanning range is 100-3200 $cm^{-1}$.

4. Application of the optical-fiber Raman photometer constructed by the method of claim 1 in collecting Raman molecular signals in different brain regions under the excitation of the excitation light; wherein, said different brain regions are cortex, hippocampus, striatum, and thalamus;

said excitation light includes 633 nm, 785 nm;

said Raman molecules include rhodamine B, copper titanocyanine, cyanine dye 5;

the scanning range is 100-3200 $cm^{-1}$.

5. The method for constructing the optical-fiber Raman photometer of claim 1, wherein, in said light source portion, said excitation center wavelength of the laser is 785 nm±0.5 nm; the output power is adjustable from 0-500 mW; the line width is less than 0.1 nm; the output interface is SMA905 or FC/PC; the working voltage is 220V.

6. The method for constructing the optical-fiber Raman photometer of claim 1, wherein, in said scanning system, said first filter is a bandpass filter, which allows the light of 785 nm to pass through; said second filter is a notch filter, for filtering 785 nm incident light; said first reflector and said second reflector are total reflectors, said scanner is a laser confocal scanning unit, and the magnification of said objective lens is 10×, NA 0.25.

7. The method for constructing the optical-fiber Raman photometer of claim 1, wherein, in said detection system, said optical fiber is a multi-mode optical fiber, the core is 200 microns, the cladding is 25 microns, and the numerical aperture (NA) is 0.22, the transmission range is 400-1100 nm, and said taper length at the end of the optical fiber is 480 microns.

* * * * *